(12) United States Patent
Loginov et al.

(10) Patent No.: US 11,476,011 B2
(45) Date of Patent: Oct. 18, 2022

(54) REACTOR CORE HAVING BOTH NUCLEAR FUEL AND A HEAT PIPE IN A MODULE LOCATED IN A SOLID NEUTRON MODERATOR

(71) Applicants: Joint Stock Company "State Scientific Centre of the Russian Federation—Institute for Physics and Power Engineering named after A.I. Leypunsky", g. Obninsk (RU); Joint Stock Company «Science and Innovations», Moscow (RU)

(72) Inventors: Nikolay Ivanovich Loginov, g. Obninsk (RU); Aleksandr Sergeevich Mikheev, g. Obninsk (RU); Aleksey Dmitrievich Krotov, g. Obninsk (RU)

(73) Assignees: JOINT STOCK COMPANY "STATE SCIENTIFIC CENTRE OF THE RUSSIAN FEDERATION INSTITUTE FOR PHYSICS AND POWER ENGINEERING NAMED AFTER A.I. LEYPUNSKY", G. Obninsk (RU); JOINT STOCK COMPANY "SCIENCE AND INNOVATIONS", Moscow (RU)

( * ) Notice: Subject to any disclaimer, the term of this patent is extended or adjusted under 35 U.S.C. 154(b) by 0 days.

(21) Appl. No.: 16/627,738

(22) PCT Filed: Dec. 25, 2018

(86) PCT No.: PCT/RU2018/000870
§ 371 (c)(1),
(2) Date: Dec. 30, 2019

(87) PCT Pub. No.: WO2020/036509
PCT Pub. Date: Feb. 20, 2020

(65) Prior Publication Data
US 2021/0335510 A1        Oct. 28, 2021

(30) Foreign Application Priority Data
Aug. 16, 2018   (RU) .......................... RU2018129925

(51) Int. Cl.
*G21C 15/257*    (2006.01)
*G21C 1/12*      (2006.01)
(Continued)

(52) U.S. Cl.
CPC ............. *G21C 15/257* (2013.01); *G21C 1/12* (2013.01); *G21C 5/02* (2013.01); *G21C 3/40* (2013.01); *G21C 5/12* (2013.01)

(58) Field of Classification Search
CPC .......... G21C 15/257; G21C 1/12; G21C 5/02; G21C 3/322; G21C 3/40; G21C 5/12
(Continued)

(56) References Cited

U.S. PATENT DOCUMENTS 3,205,147 A * 9/1965 Foure ..................... G21C 15/04
                                                         376/428
4,506,183 A * 3/1985 Morris .................... H01J 45/00
                                                         165/274
(Continued)

OTHER PUBLICATIONS

Kusuma, "Passive cooling system in a nuclear spent fuel pool using a vertical straight wickless-heat pipe", International Journal of Thermal Sciences 126 (Jan. 2018): 162-171. (Year: 2018).*
(Continued)

*Primary Examiner* — Jack W Keith
*Assistant Examiner* — Daniel Wasil
(74) *Attorney, Agent, or Firm* — J. Miguel Hernandez; James R. Gourley; Carstens & Cahoon, LLP

(57) ABSTRACT

The reactor core includes at least one module, a solid neutron moderator, and a liquid neutron moderators. Each module contains a casing, at least one heat pipe, one fuel element and thermal insulation. The heat pipe comprises a
(Continued)

casing, a wick, and a coolant. The fuel element is made of nuclear fuel, arranged along an evaporation area of the heat pipe, around the heat pipe casing, in thermal contact with the heat pipe casing, and enclosed in a can. Liquid metals are used as the coolant of the heat pipe. Thermal insulation is arranged between the can and the module casing. At least one hole is made in the solid neutron moderator. Each module is arranged within a respective hole of the solid neutron moderator. The space between the module casing and the solid neutron moderator is filled with a liquid neutron moderator.

14 Claims, 1 Drawing Sheet

(51) Int. Cl.
*G21C 5/02* (2006.01)
*G21C 3/40* (2006.01)
*G21C 5/12* (2006.01)

(58) Field of Classification Search
USPC ............................ 376/320, 321, 367, 427
See application file for complete search history.

(56) References Cited

U.S. PATENT DOCUMENTS

| | | | |
|---|---|---|---|
| 5,408,510 A * | 4/1995 | Ball | G21C 3/40 376/367 |
| 8,987,579 B2 * | 3/2015 | Lu | G21C 15/257 136/202 |
| 2005/0135542 A1 * | 6/2005 | Stellwag | G21C 15/28 376/277 |

OTHER PUBLICATIONS

Zhang, "Conceptual design of megawatt class space heat pipe reactor power system", Atomic Energy Science and Technology 51, No. 12 (2017): 2160-2164. (Year: 2017).*

* cited by examiner

REACTOR CORE HAVING BOTH NUCLEAR FUEL AND A HEAT PIPE IN A MODULE LOCATED IN A SOLID NEUTRON MODERATOR

CROSS-REFERENCE TO RELATED APPLICATIONS

This application is a US 371 application from PCT/RU2018/000870 filed Dec. 25, 2018, which claims priority to Russian Application No. 2018129925 filed Aug. 16, 2018, the technical disclosures of which are hereby incorporated herein by reference.

The invention relates to the field of nuclear power engineering and can be used in direct conversion reactors of thermal energy into electrical energy outside the core, in particular, with thermophotoelectric conversion.

Core with heat pipes [Invention application of the US "Mobile FNR cooled by heat pipes" US No. 2016/0027536 A1, published on 22 Jan. 2016] is known in prior art.

The reactor core according to this application contains arrays of rod fuel elements and heat pipes enclosed in a metal block. The fuel elements contain nuclear fuel, upper and lower neutron reflectors and gas cavities located above and below the reflectors. Heat pipes contain a sealed enclosure filled with evaporating coolant and a wick. Heat pipes are arranged so as to transfer heat outside the core to a gaseous coolant—the working medium of a gas turbine (air or CO2). The maximum temperature of the working medium (air) at the turbine inlet is about 1100 K.

The drawback of this technical solution is the relatively low temperature of the coolant at the core outlet, which does not allow the direct conversion of thermal energy into electrical energy.

The closest to the claimed technical solution in technical essence is the core of a fast reactor SAIRS [M. S. El-Genk, J-M. P. Tournier, "SAIRS"—Scalable AMTEC Integrated Reactor Space Power System//Progress in Nuclear Energy, Vol. 45, No. 1, pp. 25-34, 2004].

The core contains 60 modules, consisting of a heat pipe and 3 fuel elements. The modules are located close to each other and form a triangular package. The cans of the fuel elements are soldered to the casing of the heat pipe with a rhenium trihedral inserts that transfer heat to the heat pipe by means of thermal conductivity. Each fuel element has a gas cavity at one end. Uranium nitride pellets with concentration of 83.7% are used as fuel.

The drawback of this technical solution is the relatively low temperature of the coolant (1200K) at the core outlet, which does not allow the efficient use of thermoelectric, thermionic and thermoelectric energy converters.

The objective of the invention is to eliminate this drawback, namely, to increase the temperature of the coolant at the core outlet.

The technical result is an increase in the efficiency of nuclear power plants and the expansion of the core application scope, in particular, for reactors with thermophotovoltaic energy conversion.

The following is proposed to eliminate this drawback in the reactor core, including autonomous modules, fuel elements and heat pipes:
additionally equip the reactor core with a solid neutron moderator with holes;
provide core modules with casings and arrange in the holes of the solid neutron moderator;
arrange heat pipes and fuel elements inside the module casings;
made the fuel element of nuclear fuel arranged in the evaporation area of the heat pipe around its casing in thermal contact with it, and enclosed in a can;
arrange thermal insulation in the space between the can of fuel element and the module casing;
additionally fill the space between the modules and the solid neutron moderator with a liquid neutron moderator.

The following is proposed for particular cases of the reactor core embodiment:
first, create a vacuum in the module casing;
second, for another particular case, fill the module with an inert gas with low thermal conductivity, for example, with xenon;
third, use water as a liquid neutron moderator;
fourth, for another particular case, use a non-freezing liquid as a liquid neutron moderator, at least up to −40° C., for example, an aqueous alcohol solution;
fifth, use low-melting metals with a high boiling point, for example, lithium, calcium, lead, silver, as the coolant of the heat pipe.

Figure 1:
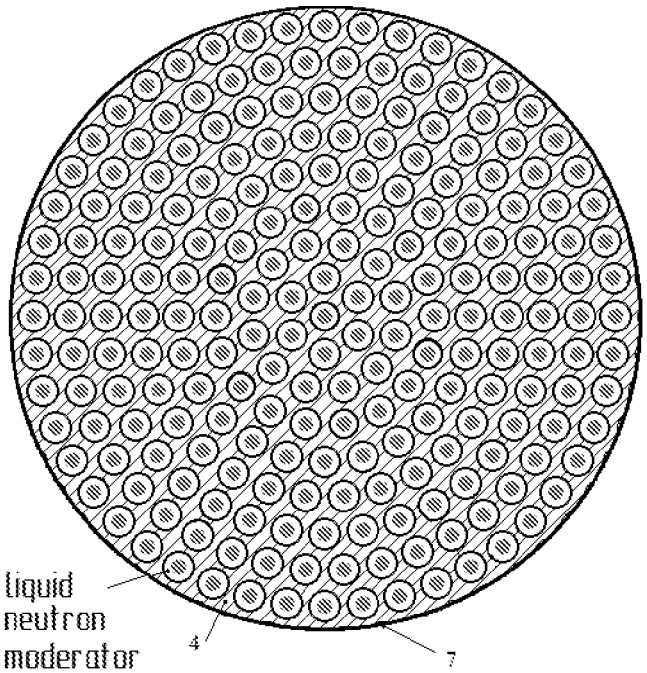
FIG. 1 illustrates an example of a cross section of a reactor core.
Figure 3:
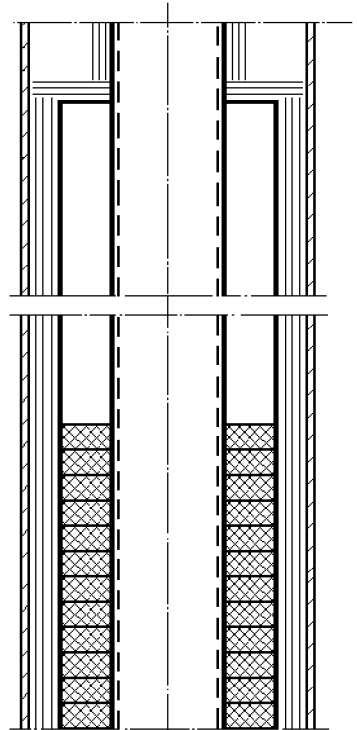
FIG. 3 illustrates an example of Section A-A module of a reactor core.
Figure 3:
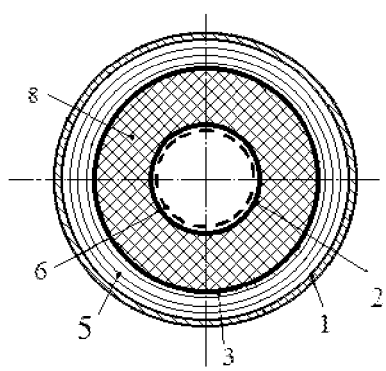
Figure 2:
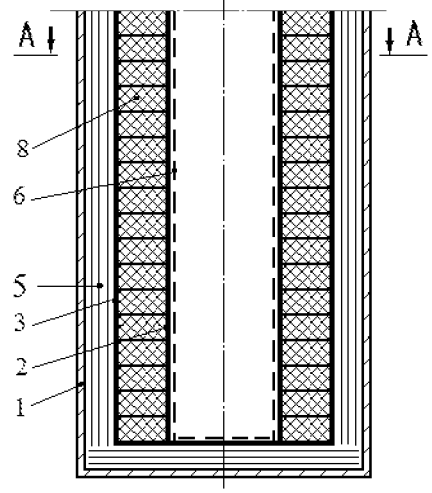
FIG. 2 illustrates an example of a module of a reactor core.

The invention is illustrated in the drawings, where the FIG. 1 shows a cross section of one embodiment of a reactor core;

the FIG. 2 shows—longitudinal cross section of one embodiment of a reactor core;

the FIG. 3 shows—a cross section of one embodiment of a reactor core module.

The following items designations are adopted in the figures: 1—module casing; 2—heat pipe casing; 3—can of the fuel element; 4—solid neutron moderator; 5—thermal insulation; 6—heat pipe wick; 7—shell of a solid moderator; 8—nuclear fuel.

The invention consists in the following.

The reactor core includes at least one core module, a solid neutron moderator 4 and a liquid neutron moderator.

The core module contains at least one heat pipe, one fuel element and thermal insulation 5.

The core module is made in the shape of a casing 1 made of a low-capture material, for example, a zirconium alloy. In the particular case of embodiment, a vacuum is created in the casing 1 of the core module. In another particular case it is filled with an inert gas with low thermal conductivity, for example, with xenon.

Vacuum or inert gas provide corrosion protection of casing 1 material of the core module, casing 2 of the heat pipe and thermal insulation 5.

The heat pipe is made in the shape of a casing 2 with a wick 6, and contains a coolant—a low-melting metal with a high boiling point.

In particular cases of embodiment, lithium, calcium, lead, silver are used as the coolant of the heat pipe.

The casing 2 and the wick 6 of the heat pipe are made of high melting point material, for example, molybdenum.

The heat pipe is designed to remove heat generated in the fuel elements outside the reactor core.

The fuel element is made of nuclear fuel 8, arranged in the evaporation area of the heat pipe around its casing 2 in thermal contact with it, and enclosed in a can 3;

The can 3 of the fuel element is made of a high melting point material, for example, molybdenum.

Uranium or plutonium isotopes in the form of oxides, nitrides, carbides with a fissile isotope content of not more than 20% are used as fissile material for nuclear fuel 8.

The purpose of the fuel elements is to obtain heat due to nuclear reactions occurring in nuclear fuel 8.

Thermal insulation 5 is arranged inside the core module between its casing 1 and the can 3 of the fuel element. Thermal insulation 5 is made in the shape of a multilayer thermal screen made of a foil of high melting point metals, for example, molybdenum.

The purpose of thermal insulation 5 is to prevent heat leakage through the casing 1 of the core module into the liquid neutron moderator.

A solid neutron moderator 4 is made of a neutron moderating material, for example, beryllium, in the shape of a cylinder or a polyhedron with holes. The whole neutron moderating material is enclosed in a shell 7 of solid moderator 4. The core modules are arranged in the holes of the solid neutron moderator 4. The space between the core modules and the solid neutron moderator 4 is filled with a liquid neutron moderator.

In particular cases, water or non-freezing liquids is used as a liquid neutron moderator, when the temperature is decreased to at least minus 40° C., for example, alcohol solutions.

A solid neutron moderator 4 and a liquid neutron moderator are designed to obtain the thermal spectrum of neutrons. In addition, a liquid neutron moderator functions as a coolant cooling a solid neutron moderator 4 and the casing 1 of the module.

The shell 7 of a solid moderator is designed to protect a solid neutron moderator 4 from the corrosive effects of a liquid neutron moderator.

The reactor core operates as follows.

A fission reaction occurs in nuclear fuel 8 of fuel elements with the release of heat. The generated heat is transferred through the casing 2 of the heat pipe to the coolant filling the wick 6 of the heat pipe. The coolant evaporates from the wick 6, the coolant vapour fills the inner space of the heat pipe casing 2, carries the heat of vaporization outside the reactor core to the energy converter, condenses there and returns via wick 6 to the evaporation area of the heat pipe. Heat transfer by the evaporating coolant occurs almost without a temperature difference between the heat source and its consumer, which makes it possible to obtain a relatively high (1500-1800K) coolant temperature not only at the reactor core outlet, but also at the energy converters entrance. This provides a higher efficiency of a nuclear power plant and expands the scope of such plants.

A solid neutron moderator 4 together with a liquid neutron moderator provides the possibility of a nuclear fission reaction in thermal neutrons in a reactor-grade nuclear fuel 8. A liquid neutron moderator complements the function of solid moderator 4 as well as functions as a coolant cooling the solid neutron moderator 4.

Due to thermal insulation 5, heat leakage through the module casing 1 is minimized, therefore, the liquid neutron moderator has a low temperature. This allows the use of water or aqueous alcohol solutions under atmospheric pressure as a liquid moderator.

A specific embodiment of the reactor core.

A solid neutron moderator 4 is made of several beryllium disks with a diameter of 760 mm and a total height of about 700 mm with 217 holes with a diameter of 40 mm. Beryllium disks are completely covered with a shell 7 made of zirconium alloy E110. The core modules are arranged in the holes of the solid neutron moderator 4. Water is used as a liquid neutron moderator. The holes in the solid neutron moderator 4 with modules are arranged in concentric circles with a minimum distance between the centres of the modules of 42 mm.

The reactor core module is made in the shape of a cylindrical casing 1 with a diameter of about 35 mm and a wall thickness of 1.5 mm, made of zirconium alloy E110. A heat pipe is arranged inside the casing 1.

The casing 2 of the heat pipe with an outer diameter of about 14 mm is made of molybdenum. A heat pipe wick 6 is mounted on the inner surface of the heat pipe casing 2, and made of two layers of a molybdenum grid with a square mesh size of about 40 microns. The wick 6 of the heat pipe is filled with liquid lithium. The evaporation area of the heat pipe together with nuclear fuel 8 is enclosed in the outer can 3 of the fuel element. The thermal insulation 5 is arranged between the casing 3 of the fuel element and the module casing 1, and made in the shape of a multilayer thermal screen made of four layers of molybdenum and five layers of zirconium foil. A vacuum is created in the module casing 1 with a residual gas pressure of not more than 10−1 Pa.

The outer can 3 of the fuel element with an outer diameter of 20 mm and a wall thickness of 1 mm is made of molybdenum, and filled with nuclear fuel pellets 8 made of uranium dioxide with concentration of 19.75%. The height of the fuel column is about 500 mm. An annular gap (not shown in the figure) is created between the fuel pellets and the can 3 of the fuel element to discharge the gaseous fission products into the cavity located above the nuclear fuel 8. The total number of fuel elements in the core is equal to the number of modules. When the thermal power of the core is 1200 kW, the average capacity of one fuel element is about 5.7 kW. The design temperature of the outer can 3 of the fuel element is 1525 K. Li7 is used as a coolant of heat pipes, water under atmospheric pressure is used as a liquid moderator.

The advantages of the proposed reactor core compared with the closest technical solution are to increase the temperature of the coolant at the core outlet from 1200 K to 1500 K and higher, which leads to the efficiency increase of nuclear power plants. Besides, this allows expansion of the scope of the core, in particular, for reactors with thermophotoelectric energy conversion.

LIST OF TERMS

Reactor Core

1. Module casing
2. Heat pipe casing
3. Fuel element can
4. Solid neutron moderator
5. Thermal insulation
6. Heat pipe wick
7. Solid moderator shell
8. Nuclear fuel
+Water (w/o number)
+Liquid coolant
+Coolant vapour
+Liquid neutron moderator
Core=solid neutron moderator+core module+liquid neutron moderator.
Core module=module casing+heat pipe+fuel elements+thermal insulation
Heat pipe=heat pipe casing+heat pipe wick+coolant.
Fuel element=fuel+can

The invention claimed is:

1. A reactor core, the reactor core comprising:
   a solid neutron moderator comprising at least one hole;
   a liquid neutron moderator; and
   at least one module, each module of the at least one module comprising:
   a module casing;
   thermal insulation positioned within the module casing;
   one heat pipe having an evaporation area, the one heat pipe comprising a heat pipe casing and a wick and containing a heat pipe coolant; and
   at least one fuel element comprising nuclear fuel and a can;
   each module of the at least one module being arranged within a respective hole of the at least one hole of the solid neutron moderator;
   the one heat pipe being located inside the module casing;
   the at least one fuel element being located along the evaporation area of the one heat pipe, around the heat pipe casing, in heat contact with the heat pipe casing, and enclosed in the can;
   the thermal insulation being arranged between the can and the module casing; and
   the space between the module casing and the solid neutron moderator being filled with the liquid neutron moderator.

2. The reactor core according to claim 1, characterized in that each module of the at least one module comprises a vacuum located in the module casing.

3. The reactor core according to claim 1, characterized in that the reactor core comprises an inert gas and the module casing of each module of the at least one module is filled with the inert gas.

4. The reactor core according to claim 1, characterized in that the heat pipe coolant is at least one liquid metal.

5. The reactor core according to claim 1, characterized in that the liquid neutron moderator is water.

6. The reactor core according to claim 1, characterized in that the liquid neutron moderator is at least one non-freezing liquid at minus 40° C.

7. The reactor core according to claim 6 characterized in that the nonfreezing liquid is an aqueous alcohol solution.

8. The reactor core according to claim 3 characterized in that the inert gas is xenon.

9. The reactor core according to claim 4 characterized in that the at least one liquid metal is selected from the group consisting of lithium, calcium, lead, and silver.

10. The reactor core according to claim 4 characterized in that the at least one liquid metal comprises a plurality of liquid metals.

11. The reactor core according to claim 10 characterized in that the plurality of liquid metals comprises metals selected from the group consisting of lithium, calcium, lead, and silver.

12. The reactor core according to claim 1 characterized in that the at least one module comprises a plurality of modules and the at least one hole comprises a plurality of holes, each module of the plurality of modules being positioned within a respective hole of the plurality of holes.

13. The reactor core according to claim 12 characterized in that the at least one fuel element of each module of the at least one module is one fuel element.

14. The reactor core according to claim 13 characterized in that the one fuel element comprises a cavity for gaseous fission products of the respective nuclear fuel of the fuel element.

* * * * *